United States Patent
Kim et al.

(10) Patent No.: US 9,955,166 B2
(45) Date of Patent: Apr. 24, 2018

(54) METHOD AND DEVICE FOR PROCESSING VIDEO SIGNAL

(71) Applicant: LG ELECTRONICS INC., Seoul (KR)

(72) Inventors: Taesup Kim, Seoul (KR); Jin Heo, Seoul (KR); Jiwook Jung, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 367 days.

(21) Appl. No.: 14/433,585

(22) PCT Filed: Oct. 4, 2013

(86) PCT No.: PCT/KR2013/008867
§ 371 (c)(1),
(2) Date: Apr. 3, 2015

(87) PCT Pub. No.: WO2014/054897
PCT Pub. Date: Apr. 10, 2014

(65) Prior Publication Data
US 2015/0215626 A1    Jul. 30, 2015

Related U.S. Application Data

(60) Provisional application No. 61/710,000, filed on Oct. 5, 2012, provisional application No. 61/719,970, filed on Oct. 30, 2012.

(51) Int. Cl.
*H04N 19/139* (2014.01)
*H04N 19/119* (2014.01)
(Continued)

(52) U.S. Cl.
CPC ......... *H04N 19/139* (2014.11); *H04N 19/119* (2014.11); *H04N 19/122* (2014.11);
(Continued)

(58) Field of Classification Search
None
See application file for complete search history.

(56) References Cited

U.S. PATENT DOCUMENTS

| | | | |
|---|---|---|---|
| 2007/0025442 A1* | 2/2007 | Okada | H04N 19/52 375/240.03 |
| 2013/0182779 A1 | 7/2013 | Lim et al. | |

(Continued)

FOREIGN PATENT DOCUMENTS

| | | |
|---|---|---|
| JP | 2005-318620 A | 11/2005 |
| KR | 10-2007-0098437 A | 10/2007 |

(Continued)

OTHER PUBLICATIONS

Na, Taeyoung, et al., "An Extended AMVP Scheme in HEVC with MPEG-2 fro a Hybrid Stereoscopic Encoder", IEEE INternational Symposium on Broadband Multimedia Systems and Broadcasting (BMSB) (Jun. 2012).*

(Continued)

*Primary Examiner* — William C Vaughn, Jr.
*Assistant Examiner* — Lindsay Uhl
(74) *Attorney, Agent, or Firm* — Dentons US LLP

(57) ABSTRACT

The present invention relates to a method for processing a video signal and a video decoder, wherein an offset parameter of a reference block is acquired, an offset parameter of a current block is acquired by using the offset parameter of the reference block, an adaptive parameter is applied to the current block by using the offset parameter of the current block, and the reference block is a block in a different view point from the current block. According to the present invention, an accurate adaptive parameter can be applied to the current block by using an offset parameter of a reference (Continued)

view point in consideration of a difference between view points when obtaining the offset parameter of the current block.

8 Claims, 12 Drawing Sheets

(51) Int. Cl.
| | |
|---|---|
| *H04N 19/167* | (2014.01) |
| *H04N 19/597* | (2014.01) |
| *H04N 19/463* | (2014.01) |
| *H04N 19/122* | (2014.01) |
| *H04N 19/176* | (2014.01) |
| *H04N 19/182* | (2014.01) |
| *H04N 19/82* | (2014.01) |

(52) U.S. Cl.
CPC ......... *H04N 19/167* (2014.11); *H04N 19/176* (2014.11); *H04N 19/182* (2014.11); *H04N 19/463* (2014.11); *H04N 19/597* (2014.11); *H04N 19/82* (2014.11)

(56) References Cited

U.S. PATENT DOCUMENTS

| | | | | |
|---|---|---|---|---|
| 2013/0343459 | A1* | 12/2013 | Bici | H04N 19/00684 375/240.16 |
| 2014/0192891 | A1* | 7/2014 | Alshina | H04N 19/189 375/240.24 |
| 2014/0328389 | A1* | 11/2014 | Fu | H04N 19/597 375/240.02 |
| 2015/0312545 | A1* | 10/2015 | Xu | H04N 19/597 348/43 |

FOREIGN PATENT DOCUMENTS

| | | |
|---|---|---|
| KR | 10-2010-0014553 A | 2/2010 |
| KR | 1020120033289 A | 4/2012 |
| KR | 10-2012-0082960 A | 7/2012 |
| KR | 10-2012-0095611 A | 8/2012 |

OTHER PUBLICATIONS

Koo, HS et al.: "MVC Motion Skip Mode", Joint Video Team (JVT) of ISO/IEC MPEG & ITU-T VCEG (ISO/IEC JTC1/SC29/WG11 and ITU-T SG16 Q.6), Document: JVT-W081, Filename: JVT-W081.doc, 23rd Meeting: San Jose, California, USA, Apr. 21-27, 2007, XP030007041.

Ikai, T. et al.: "On sao_merge_left_flag for effective Mx1 CTB coding", Joint Collaborative Team on Video Coding (JCT-VC) of ITU-T SG 16 WP 3 and ISO/IEC JTC 1/SC 29/WG 11, Document: JCTVC-J0179, 10th Meeting: Stockholm, SE, Jul. 11-20, 2012, XP030112541.

Kim, IK, et al.: "HM7: High Efficiency Video Coding (HEVC) Test Model 7 Encoder Description", Joint Collaborative Team on Video Coding (JCT-VC) of ITU-T SG16 WP3 and ISO/IEC JTC1/SC29/WG11, Document:JCTVC-I1002, 9th Meeting: Geneva, CH, Apr. 27-May 7, 2012, XP030112372.

* cited by examiner

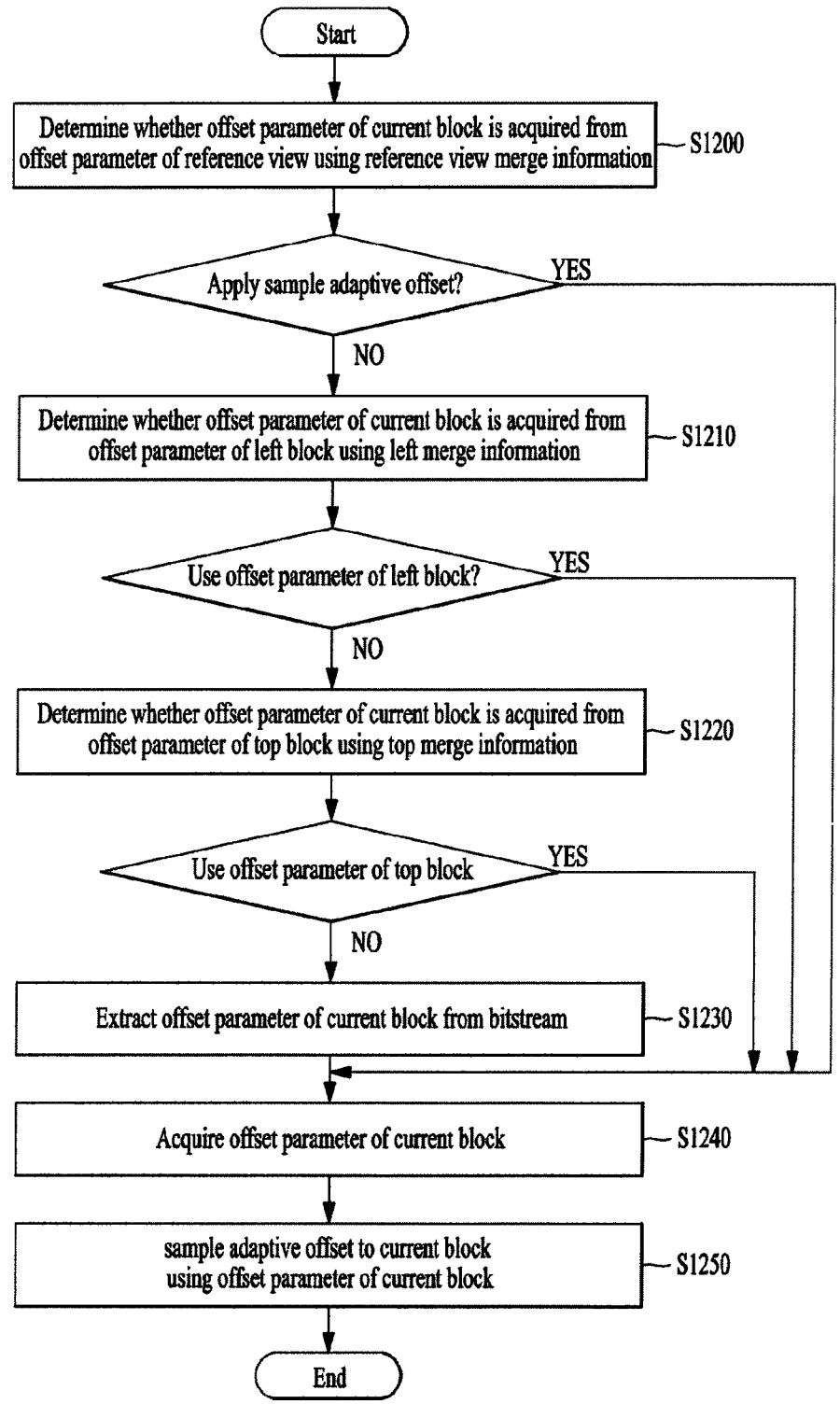

METHOD AND DEVICE FOR PROCESSING VIDEO SIGNAL

This application is a 35 U.S.C. § 371 National Stage Entry of International Application No. PCT/KR2013/008867 filed Oct. 4, 2013, which claims benefit of and priority to U.S. Provisional Application Nos. 61/710,000 filed Oct. 5, 2012 and 61/719,970 filed Oct. 30, 2012 filed Oct. 30, 2012, all of which are incorporated by reference for all purposes as if fully set forth herein.

TECHNICAL FIELD

The present invention relates to a method and device for processing a video signal.

BACKGROUND ART

Compression refers to a signal processing technique for transmitting digital information through a communication line or storing the digital information in a form suitable for a storage medium. Compression targets include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention can acquire an offset parameter of a current block using an offset parameter of a reference block in a reference view.

The present invention can acquire the offset parameter of the current block in consideration of a disparity between the reference view and the current view.

The present invention can determine whether to apply a sample adaptive offset to the current block using an identical adaptive offset region.

The present invention can determine whether the offset parameter of the current block is acquired from an offset parameter of a reference view using reference view merge information.

Advantageous Effects

The present invention can apply a correct sample adaptive offset to the current block by using the offset parameter of the reference view to acquire the offset parameter of the current block.

The present invention can apply a correct sample adaptive offset to the current block by obtaining the offset parameter of the current block in consideration of a disparity between the reference view and the current view.

DESCRIPTION OF DRAWINGS

FIG. 12 is a flowchart illustrating a fourth embodiment of applying the sample adaptive offset to the current block using the offset parameter of the reference block as an embodiment of the present invention.

BEST MODE

The present invention provides a video signal processing method and apparatus for obtaining an offset parameter of a reference block, obtaining an offset parameter of a current block using the offset parameter of the reference block and applying a sample adaptive offset to the current block using the offset parameter of the current block, wherein the reference block is a block in a different view from the current block.

The video signal processing method and apparatus may acquire disparity information and acquire the offset parameter of the current block using the disparity information.

The video signal processing method and apparatus may acquire global disparity information, and the disparity information may be acquired using the global disparity information.

The video signal processing method and apparatus may acquire the offset parameter in units of pixels in the current block.

When the current block has a size of 2N×2N, the offset parameter may be acquired in units of 2N×N.

The video signal processing method and apparatus may acquire an identical adaptive offset region and determine whether to apply the sample adaptive offset using the identical adaptive offset region and a predetermined threshold value.

The video signal processing method and apparatus may acquire reference view merge information and acquire the offset parameter of the current block using the reference view merge information, wherein the reference view merge information indicates whether the offset parameter of the current block is acquired using the offset parameter of the reference block.

Modes for Invention

Techniques for compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include both the concepts of encoding and decoding in the specification and can be flexibly interpreted within the technical spirit and technical scope of the present invention.

Figure 1:
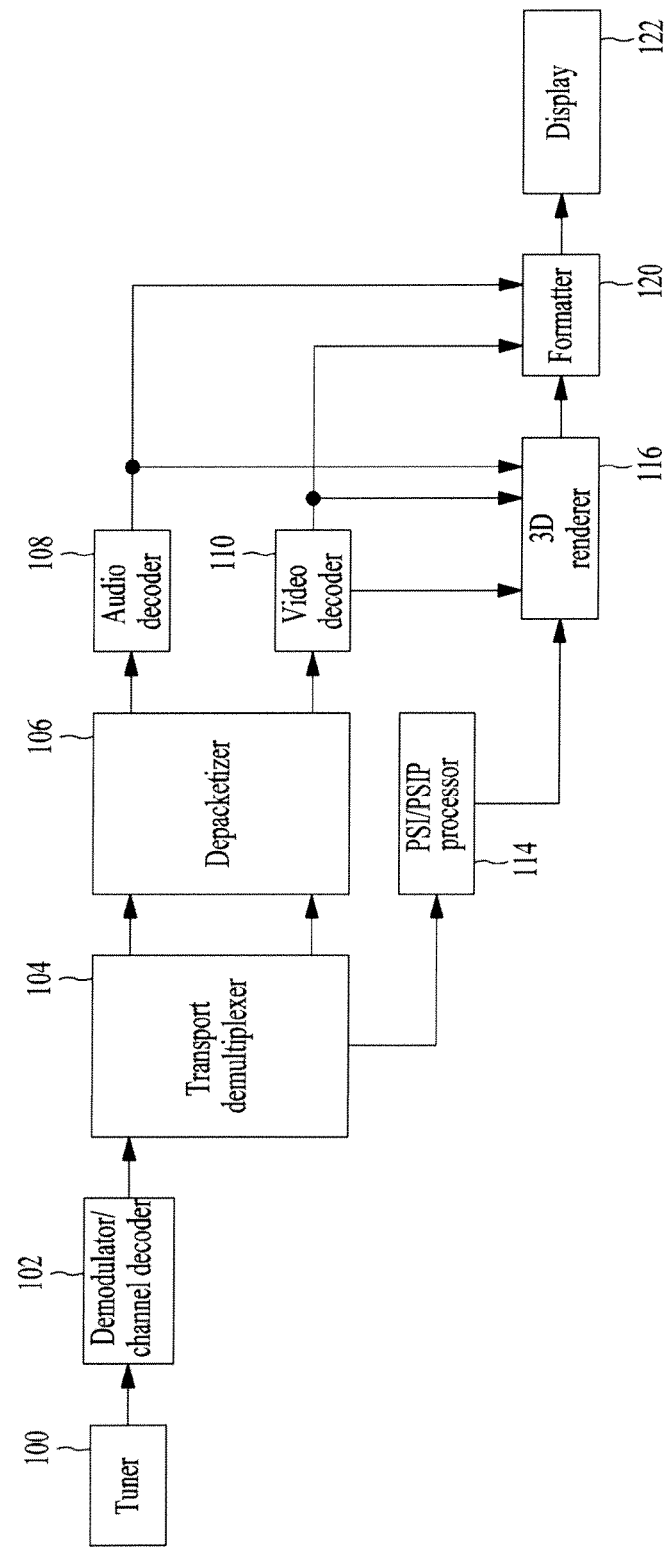
FIG. 1 is a block diagram of a broadcast receiver to which depth coding is applied according to an embodiment of the present invention.

FIG. 1 is a block diagram of a broadcast receiver to which depth coding is applied according to an embodiment to which the present invention is applied.

The broadcast receiver according to the present embodiment receives terrestrial broadcast signals to reproduce images. The broadcast receiver can generate three-dimensional content using received depth related information. The broadcast receiver includes a tuner 100, a demodulator/channel decoder 102, a transport demultiplexer 104, a depacketizer 106, an audio decoder 108, a video decoder 110, a PSI/PSIP processor 114, a 3D renderer 116, a formatter 120 and a display 122.

The tuner 100 selects a broadcast signal of a channel tuned by a user from among a plurality of broadcast signals input through an antenna (not shown) and outputs the selected broadcast signal. The demodulator/channel decoder 102 demodulates the broadcast signal from the tuner 100 and performs error correction decoding on the demodulated signal to output a transport stream TS. The transport demultiplexer 104 demultiplexes the transport stream so as to divide the transport stream into a video PES and an audio PES and extract PSI/PSIP information. The depacketizer 106 depacketizes the video PES and the audio PES to restore a video ES and an audio ES. The audio decoder 108 outputs an audio bitstream by decoding the audio ES. The audio bitstream is converted into an analog audio signal by a digital-to-analog converter (not shown), amplified by an amplifier (not shown) and then output through a speaker (not shown). The video decoder 110 decodes the video ES to restore the original image. The decoding processes of the audio decoder 108 and the video decoder 110 can be performed on the basis of a packet ID (PID) confirmed by the PSI/PSIP processor 114. During the decoding process, the video decoder 110 can extract depth information. In addition, the video decoder 110 can extract additional information necessary to generate an image of a virtual camera view, for example, camera information or information for estimating an occlusion hidden by a front object (e.g. geometrical information such as object contour, object transparency information and color information), and provide the additional information to the 3D renderer 116. However, the depth information and/or the additional information may be separated from each other by the transport demultiplexer 104 in other embodiments of the present invention.

The PSI/PSIP processor 114 receives the PSI/PSIP information from the transport demultiplexer 104, parses the PSI/PSIP information and stores the parsed PSI/PSIP information in a memory (not shown) or a register so as to enable broadcasting on the basis of the stored information. The 3D renderer 116 can generate color information, depth information and the like at a virtual camera position using the restored image, depth information, additional information and camera parameters.

In addition, the 3D renderer 116 generates a virtual image at the virtual camera position by performing 3D warping using the restored image and depth information regarding the restored image. While the 3D renderer 116 is configured as a block separated from the video decoder 110 in the present embodiment, this is merely an exemplary and the 3D renderer 116 may be included in the video decoder 110.

The formatter 120 formats the image restored in the decoding process, that is, the actual image captured by a camera, and the virtual image generated by the 3D renderer 116 according to the display mode of the broadcast receiver such that a 3D image is displayed through the display 122. Here, synthesis of the depth information and virtual image at the virtual camera position by the 3D renderer 116 and image formatting by the formatter 120 may be selectively performed in response to a user command. That is, the user may manipulate a remote controller (not shown) such that a composite image is not displayed and designate an image synthesis time.

As described above, the depth information for generating the 3D image is used by the 3D renderer 116. However, the depth information may be used by the video decoder 110 in other embodiments. A description will be given of various embodiments in which the video decoder 110 uses the depth information.

Figure 2:
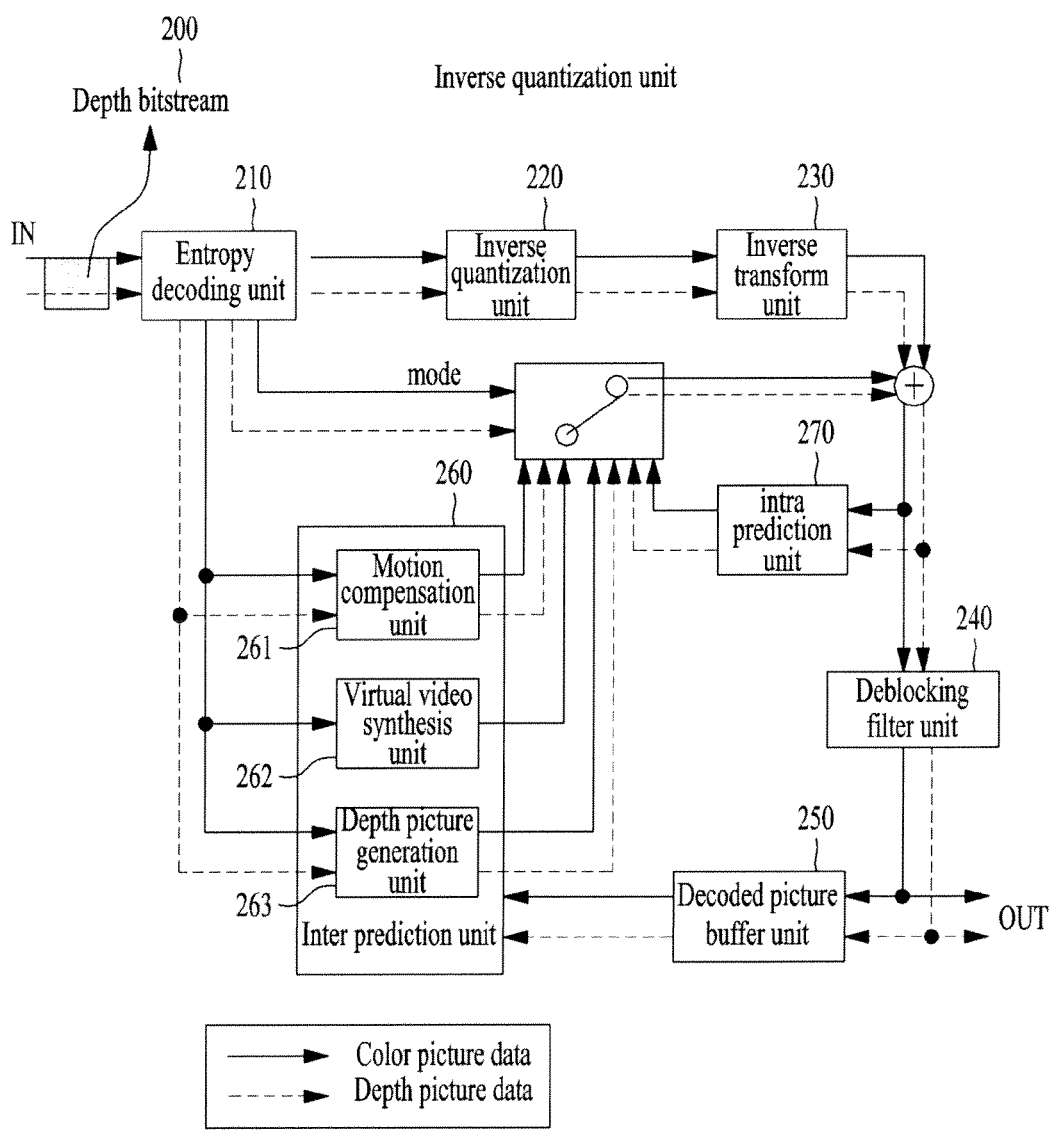
FIG. 2 is a block diagram of a video decoder according to an embodiment of the present invention.

FIG. 2 is a block diagram of the video decoder according to an embodiment to which the present invention is applied.

Referring to FIG. 2, the video decoder 110 may include an entropy decoding unit 210, an inverse quantization unit 220, an inverse transform unit 230, an in-loop filter unit 240, a decoded picture buffer unit 250, an inter prediction unit 260 and an intra prediction unit 270. In FIG. 2, solid lines represent flow of color picture data and dotted lines represent flow of depth picture data. While the color picture data and the depth picture data are separately represented in FIG. 2, separate representation of the color picture data and the depth picture data may refer to separate bitstreams or separate flows of data in one bitstream. That is, the color picture data and the depth picture data can be transmitted as one bitstream or separate bitstreams. FIG. 2 only shows data flows and does not limit operations to operation performed in one decoder.

First of all, to decode a received depth bitstream 200, the depth bitstream 200 is parsed per NAL. Here, various types of attribute information regarding depth may be included in an NAL header region, an extended region of the NAL header, a sequence header region (e.g. sequence parameter set), an extended region of the sequence header, a picture header region (e.g. picture parameter set), an extended region of the picture header, a slice header region, an extended region of the slice header, a slice data region or a macro block region. While depth coding may be performed using a separate codec, it may be more efficient to add attribute information regarding depth only in the case of depth bitstream if compatibility with existing codecs is achieved. For example, depth identification information for identifying a depth bitstream can be added to the sequence header region (e.g. sequence parameter set) or the extended region of the sequence header. Attribute information regarding a depth sequence can be added only when an input bitstream is a depth coded bitstream, according to the depth identification information.

The parsed depth bitstream 200 is entropy-decoded through the entropy decoding unit 210 and a coefficient, a motion vector and the like of each macro block are extracted. The inverse quantization unit 220 multiplies a received quantized value by a predetermined constant so as to obtain a transformed coefficient and the inverse transform unit 230 inversely transforms the coefficient to restore depth information of a depth picture. The intra prediction unit 270 performs intra prediction using the restored depth information of the current depth picture.

The in-loop filter unit 240 may include a deblocking filter unit 241 and an adaptive offset unit 242. The deblocking filter unit 241 applies deblocking filtering to each coded macro block in order to reduce block distortion. The deblocking filter unit improves the texture of a decoded frame by smoothing edges of blocks. A filtering process is selected depending on boundary strength and an image sample gradient around a boundary. The adaptive offset unit 242 applies a sample adaptive offset (SOD) to a macro block to which deblocking filtering has been applied in order to reduce a difference from the original image. A method and device for applying the SOD will be described in detail later. In-loop-filtered depth pictures are output or stored in the decoded picture buffer unit 250 to be used as reference pictures.

The decoded picture buffer unit 250 stores or opens previously coded depth pictures for inter prediction. Here, to store coded depth pictures in the decoded picture buffer unit 250 or to open stored coded depth pictures, frame_num and POC (Picture Order Count) of each picture are used. Since the previously coded pictures may include depth pictures corresponding to views different from the current depth picture, depth view information for identifying views of depth pictures as well as frame_num and POC can be used in order to use the previously coded pictures as reference pictures in depth coding.

In addition, the decoded picture buffer unit 250 may use the depth view information in order to generate a reference picture list for inter-view prediction of depth pictures. For example, the decoded picture buffer unit 250 can use depth-view reference information. The depth-view reference information refers to information used to indicate dependence between views of depth pictures. For example, the depth-view reference information may include the number of depth views, a depth view identification number, the number of depth-view reference pictures, depth view identification numbers of depth-view reference pictures and the like.

The decoded picture buffer unit 250 manages reference pictures in order to implement more flexible inter prediction. For example, a memory management control operation method and a sliding window method can be used. Reference picture management unifies a reference picture memory and a non-reference picture memory into one memory and manages the unified memory so as to achieve efficient management with a small-capacity memory. In depth coding, depth pictures can be separately marked to be discriminated from color pictures in the decoded picture buffer unit and information for identifying each depth picture can be used in the marking process. Reference pictures managed through the aforementioned procedure can be used for depth coding in the inter prediction unit 260.

Referring to FIG. 2, the inter prediction unit 260 may include a motion compensation unit 261, a virtual view synthesis unit 262 and a depth picture generation unit 263.

The motion compensation unit 261 compensates for motion of the current block using information transmitted from the entropy decoding unit 210. The motion compensation unit 261 extracts motion vectors of neighboring blocks of the current block from a video signal and acquires a motion vector prediction value of the current block. The motion compensation unit 261 compensates for motion of the current block using the motion vector prediction value and a differential vector extracted from the video signal. Motion compensation may be performed using one reference picture or a plurality of pictures. In depth coding, motion compensation can be performed using information on a reference picture list for inter-view prediction of depth pictures stored in the decoded picture buffer unit 250 when the current depth picture refers to a depth picture of a different view. Further, motion compensation may be performed using depth view information for identifying the view of the depth picture.

The virtual view synthesis unit 262 synthesizes a color picture of a virtual view using color pictures of neighboring views of the view of the current color picture. To use the color pictures of the neighboring views or to use color pictures of a desired specific view, view identification information indicating the views of the color pictures can be used. When the color picture of the virtual view is generated, flag information indicating whether the color picture of the virtual view is generated can be defined. When the flag information indicates generation of the color picture of the virtual view, the color picture of the virtual view can be generated using the view identification information. The color picture of the virtual view, acquired through the virtual view synthesis unit 262, may be used as a reference picture. In this case, the view identification information can be assigned to the color picture of the virtual view.

In another embodiment, the virtual view synthesis unit 262 can synthesize a depth picture of a virtual view using depth pictures corresponding to neighboring views of the view of the current depth picture. In this case, depth view identification information indicating the view of a depth picture can be used. Here, the depth view identification information can be derived from view identification information of a corresponding color picture. For example, the corresponding color picture can have the same picture output order information and the same view identification information as those of the current depth picture.

The depth picture generation unit 263 can generate the current depth picture using depth coding information. Here, the depth coding information may include a distance parameter indicating a distance between a camera and an object (e.g. a Z-coordinate value on a camera coordinate system or the like), macro block type information for depth coding, information for identifying a boundary in a depth picture, information indicating whether data in RBSP includes depth-coded data, information indicating whether a data type is depth picture data, color picture data or parallax data and the like. In addition, the current depth picture may be predicted using the depth coding information. That is, inter prediction using neighboring depth pictures of the current depth picture can be performed and intra prediction using decoded depth information in the current depth picture can be performed.

A description will be given of an embodiment of applying a sample adaptive offset to a current block. The aforementioned adaptive offset unit 242 can apply the sample adaptive offset to the current block using an offset parameter. The offset parameter is a parameter used to apply the sample adaptive offset and can indicate a prediction value of a difference between a pixel value of a block to which deblocking filtering has been applied and a pixel value of a block to which the sample adaptive offset has been applied. For example, the same pixel value as the original image can be restored by summing a prediction value of the current block restored by applying the sample adaptive offset thereto and the offset parameter. The offset parameter includes a band offset parameter and an edge offset parameter. The band offset parameter is an offset parameter corresponding to 32 bands. The 32 bands may be pixel values of a block in an image, which are classified according to intensity. The edge offset parameter is an offset parameter considering edge information and is acquired on the basis of a result of comparison of a value of a current pixel to which deblocking filtering has been applied with values of neighboring pixels. The neighboring pixels are two pixels adjacent to the current pixel. The two neighboring pixels may be left and right neighboring pixels of the current pixel, top and bottom neighboring pixels of the current pixel, left-top and right-bottom neighboring pixels of the current pixel or left-bottom and right-top neighboring pixels of the current pixel. Here, the result of comparison of the current pixel value with neighboring pixel values may be as shown in Table 1.

TABLE 1

| Category | Conditions |
|---|---|
| 1 | Current pixel value <2 neighboring pixel values |
| 2 | Current pixel value <1 neighboring pixel value and current pixel value = 1 neighboring pixel value |
| 3 | Current pixel value >1 neighboring pixel value and current pixel value = 1 neighboring pixel value |
| 4 | Current pixel value >2 neighboring pixel values |
| 0 | Conditions are not satisfied |

Categories can be sorted on the basis of results of comparison of the current pixel value and two neighboring pixel values, as shown in Table 1. The sign of the edge offset parameter applied to the current pixel can be determined on the basis of a corresponding category.

The offset parameter of the current block can be extracted from a bitstream or acquired using an offset parameter of a block other than the current block. A method and a device for obtaining the offset parameter of the current block and applying a sample adaptive offset to the current block are described in the specification.

Figure 3:
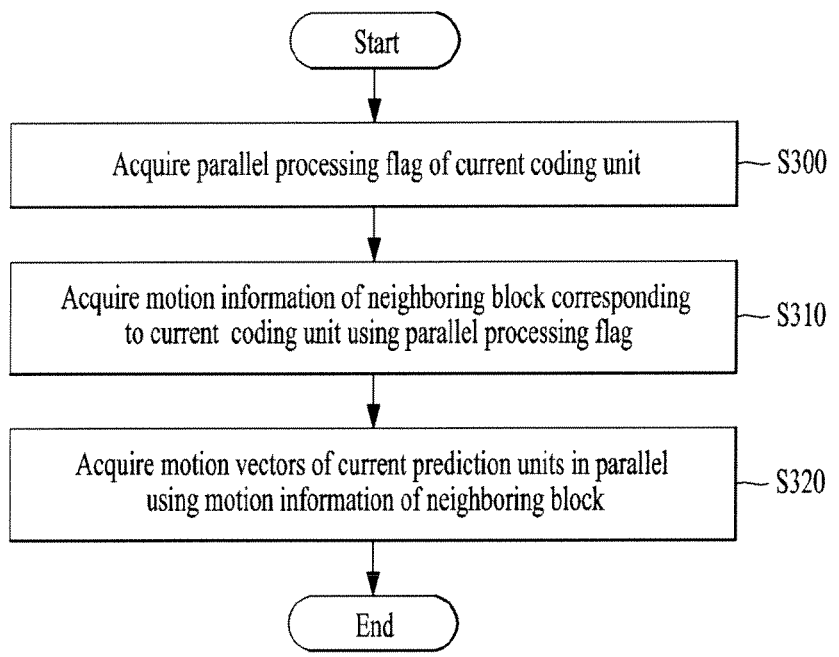
FIG. 3 is a flowchart illustrating a first embodiment of applying a sample adaptive offset to a current block using an offset parameter of a reference block as an embodiment of the present invention.

FIG. 3 is a flowchart illustrating a first embodiment of applying the sample adaptive offset to the current block using an offset parameter of a reference block as an embodiment to which the present invention is applied.

An offset parameter of a macro block in a reference picture can be acquired (S300). The reference picture is a picture used to acquire the offset parameter of the current block and may be positioned in a different view from a current picture including the current block and at the same time as the current picture. The offset parameter of the macro block in the reference picture may be obtained prior to acquisition of the offset parameter of the current picture. Methods for obtaining the offset parameter of the macro block in the reference picture include a method of using an offset parameter corresponding to a left block of the macro block in the reference picture, a method of using a top block of the macro block in the reference picture and a method of obtaining the offset parameter of the macro block in the reference picture from a bitstream. When left block merge information merge_left_flag regarding the macro block in the reference picture is 1, the same value as the offset parameter corresponding to the left block of the macro block in the reference picture can be acquired as the offset parameter of the macro block. When top block merge information merge_up_flag regarding the macro block in the reference picture is 1, the same value as the offset parameter corresponding to the top block of the macro block in the reference picture can be acquired as the offset parameter of the macro block. When both the left block merge information and the top block merge information are 0, the offset parameter of the macro block in the reference picture can be acquired from a bitstream.

The offset parameter of the current block can be acquired using an offset parameter of a reference block at the same position as the current block, in the reference picture (S310). The offset parameter of the current block can be acquired from the reference block in the reference picture. The reference block is a block included in the reference picture and may be positioned in a different view from the current block and at the same time as the current block. The reference block may be at the same position as the current block in the reference picture without considering a disparity between a current view V1 including the current block and a reference view V0 including the reference block. The offset parameter of the current block can be acquired as the same value as the offset parameter of the reference block. The reference block at the same position as the current block in the reference picture will be described in detail with reference to FIG. 4.

The sample adaptive offset can be applied to the current block using the offset parameter of the current block (S320).

Figure 4:
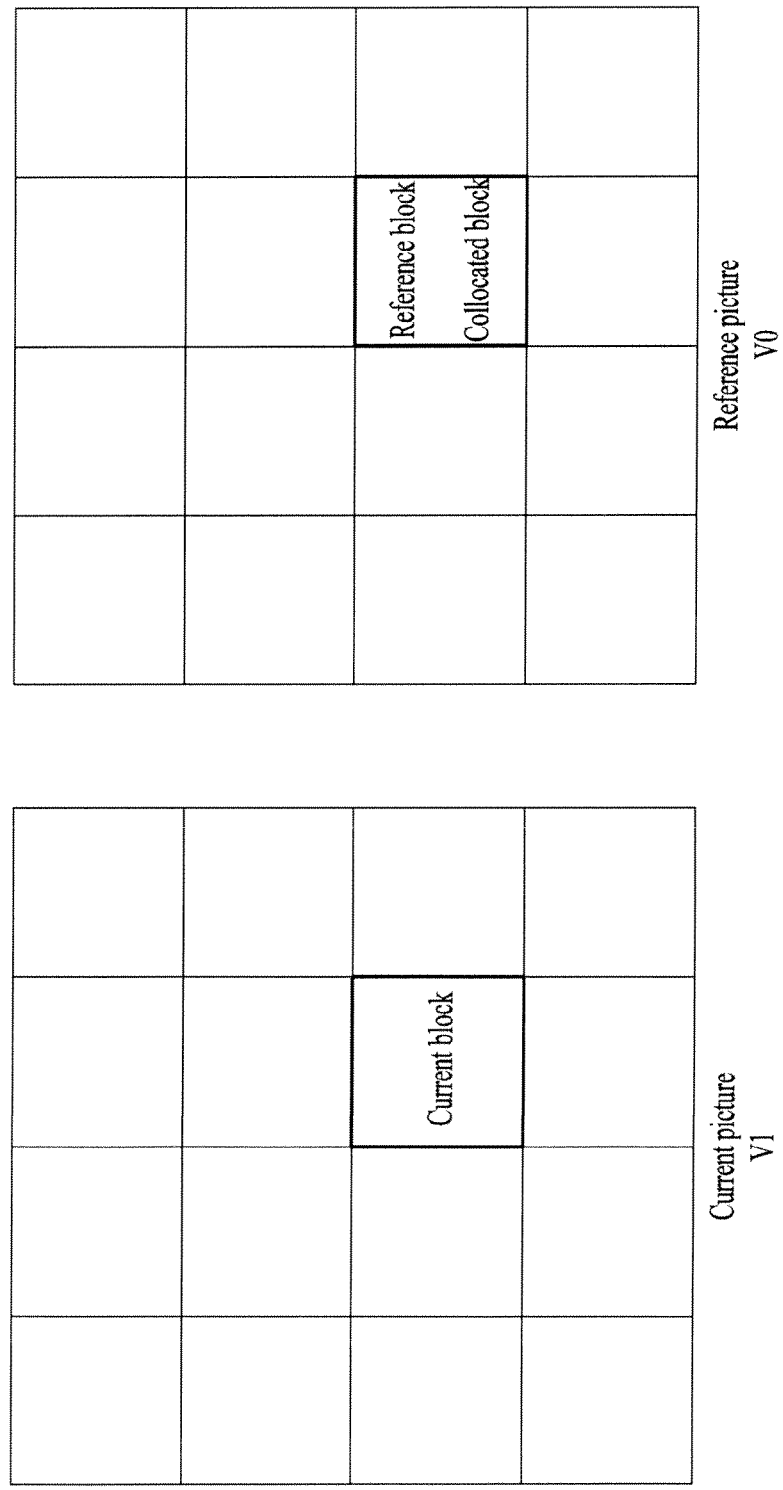
FIG. 4 illustrates an example of a reference block at the same position as the current block, in a reference picture according to an embodiment of the present invention.

FIG. 4 illustrates an exemplary reference block at the same position as the current block in the reference picture according to an embodiment of the present invention.

In the embodiment described with reference to FIG. 3, the reference block included in the reference picture is located at the same position as the current block in the current picture. The coordinates of a left-top pixel of a collocated block in the reference picture can be identical to the coordinates of a left-top pixel of the current block in the current picture. The collocated block in the reference picture can be specified using the coordinates of the left-top pixel. The collocated block can be used as a reference block.

The method for obtaining the offset parameter of the current block, shown in FIG. 3, uses only the offset parameter of the reference view without considering disparity information, and thus the quantity of used bits and complexity can be reduced.

Figure 5:
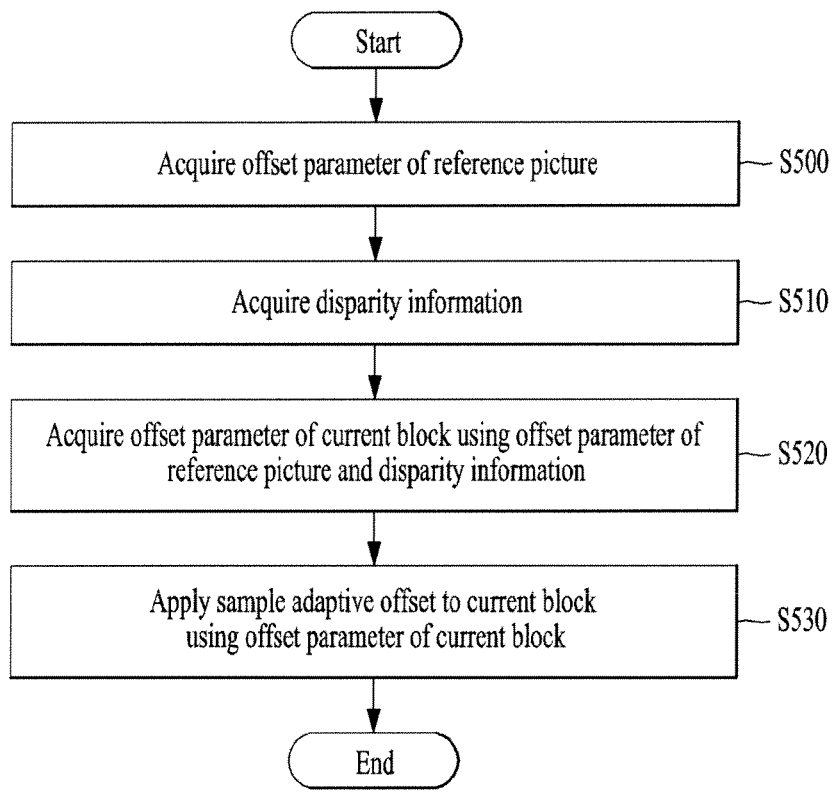
FIG. 5 is a flowchart illustrating a second embodiment of applying the sample adaptive offset to the current block using the offset parameter of the reference block as an embodiment of the present invention.

FIG. 5 is a flowchart illustrating a second embodiment of applying the sample adaptive offset to the current block using the offset parameter of the reference block as an embodiment to which the present invention is applied.

The offset parameter of the reference picture can be acquired (S500). A method of obtaining the reference picture and the offset parameter is as described above with reference to FIG. 3.

Disparity information can be acquired (S510). The disparity information refers to information indicating a difference or a disparity between the current view and the reference view. The disparity information may be acquired on a macro block basis through a bitstream or obtained using global disparity information. The global disparity information represents a representative disparity indicating a difference between the current view and the reference view and can be transmitted on a picture or sequence basis. When the global disparity information is transmitted, the entire global disparity information may be transmitted or only a difference between the global disparity information of the current picture and global disparity information of a picture prior to the current picture may be transmitted. Disparity information of each macro block can be identical to the global disparity information. Alternatively, disparity information of each macro block may be global disparity information corrected using disparity compensation information.

The offset parameter of the current block can be acquired using the offset parameter and the disparity information of the reference picture (S520). The position of the reference block can be acquired by moving the reference picture using the disparity information. The offset parameter of the current block can be acquired on a pixel basis, like the offset parameter of the reference block. The position of the reference block moved by a disparity corresponding to the disparity information will be described in detail with reference to FIGS. 6 to 9.

The sample adaptive offset can be applied to the current block using the offset parameter of the current block (S530).

A description will be given of a method for determining a reference block using disparity information.

Figure 6:
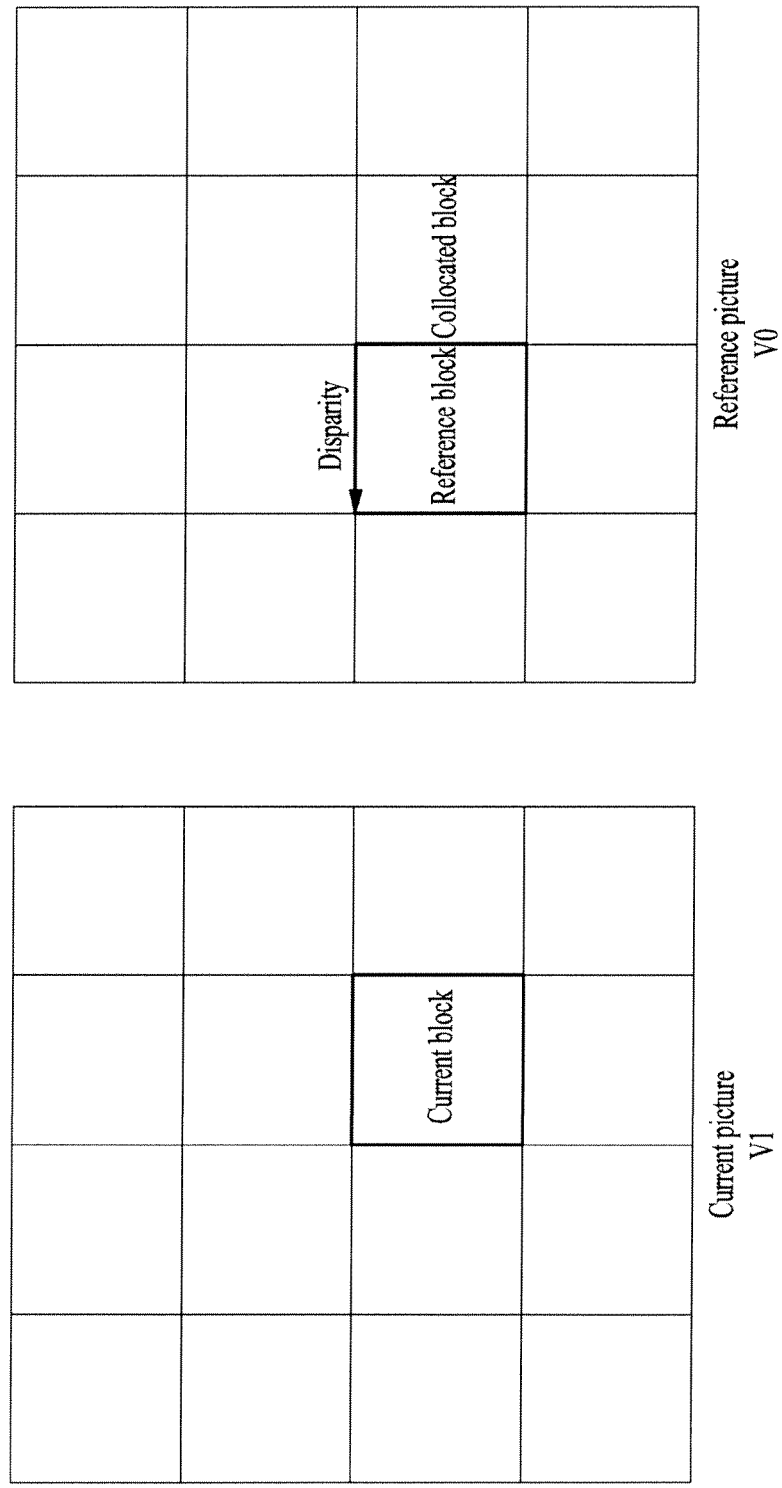
FIG. 6 illustrates an example of determining a reference block using disparity information according to an embodiment of the present invention.

FIG. 6 illustrates an example of determining a reference block using disparity information according to an embodiment of the present invention.

The position of a reference block in a reference picture may be different from the position of the current block in the current picture by a disparity. The position of the reference block can be acquired as a block in the reference picture, which corresponds to pixels in the range corresponding to the sum of the position of a left-top pixel of a collocated block of the current block, included in the reference picture, and the disparity.

The block acquired using the disparity information can be aligned with blocks in the reference picture, as shown in FIG. 6. The block acquired using the disparity information can be used as a reference block.

However, the block acquired using the disparity information may not be aligned with the blocks in the reference picture, differently from the case of FIG. 6.

Figure 7:
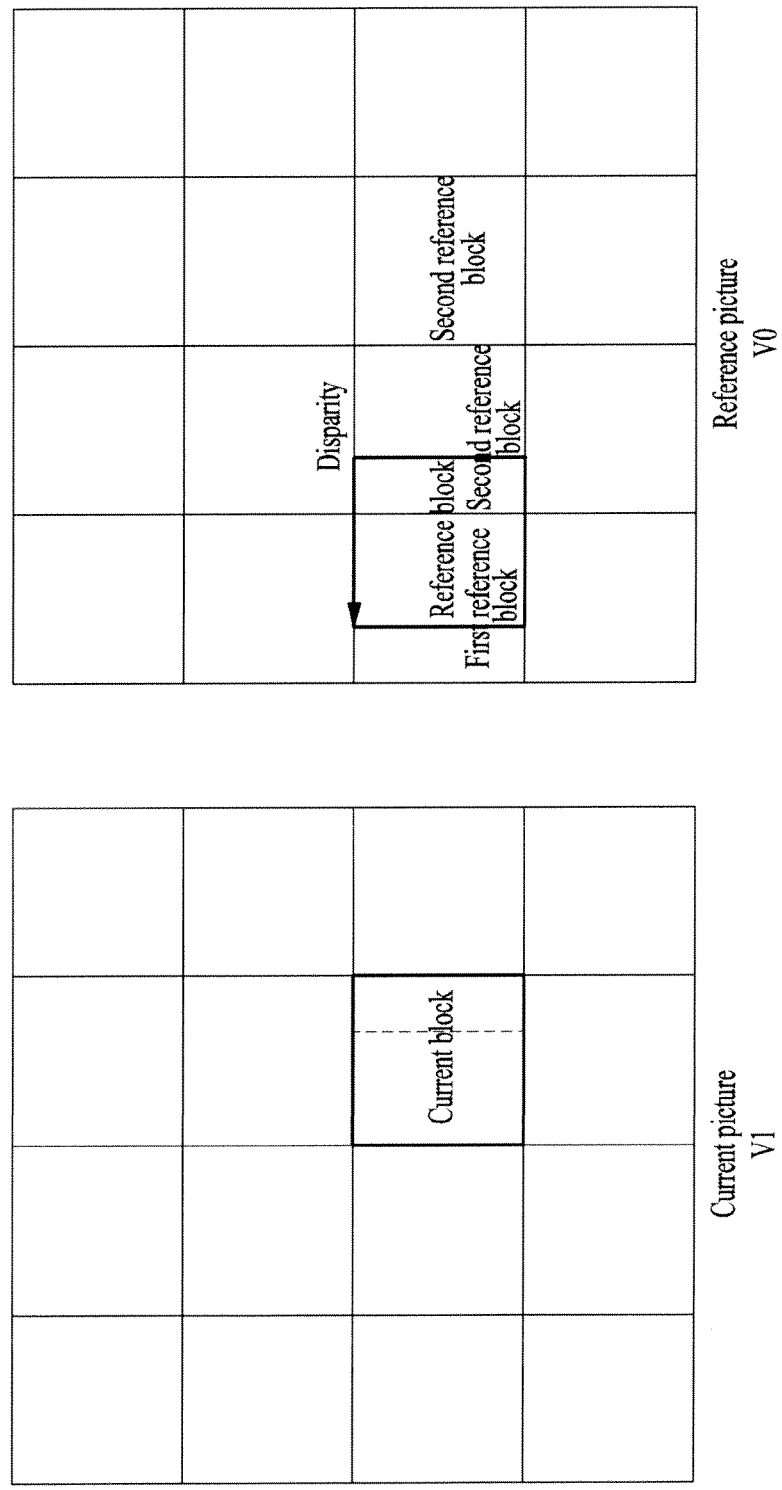
FIG. 7 illustrates an example of determining a reference block using disparity information according to an embodiment of the present invention.
Figure 8:
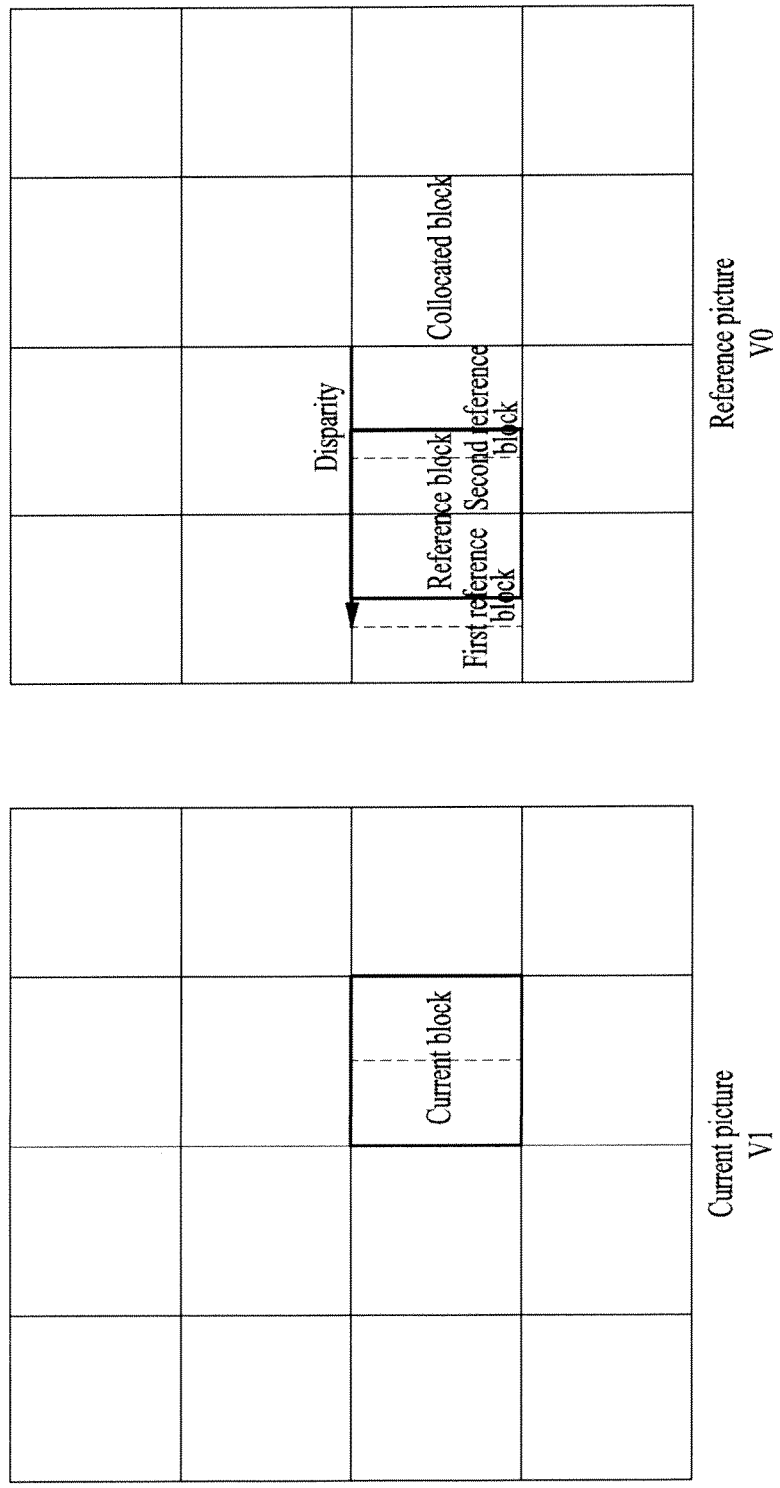
FIG. 8 illustrates an example of determining a reference block using disparity information according to an embodiment of the present invention.
Figure 9:
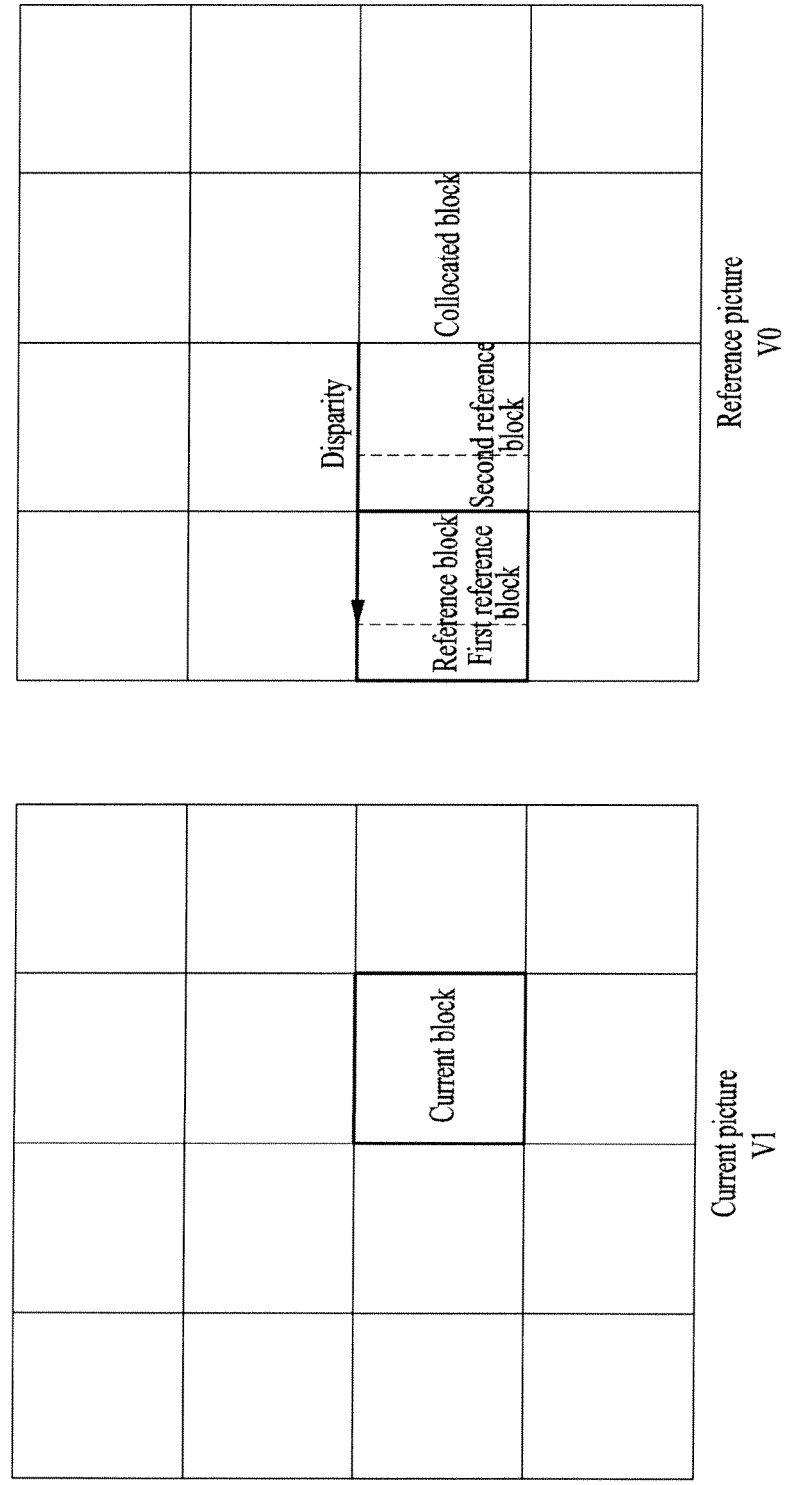
FIG. 9 illustrates an example of determining a reference block using disparity information according to an embodiment of the present invention.

A description will be given of a method for determining a reference block when the block acquired using the disparity information is not aligned with the blocks in the reference picture. In FIGS. 7, 8 and 9, the block acquired using the disparity information is not aligned with the blocks in the reference picture and is positioned over a first reference block and a second reference block. In other words, the block acquired using the disparity information is included in a region including the first reference block and the second reference block.

FIG. 7 illustrates an example of determining a reference block using disparity information according to an embodiment of the present invention.

As shown in FIG. 7, the block positioned over the first reference block and the second reference block can be determined as the reference block and the offset parameter of the current block can be acquired on a pixel basis. The first reference block may be a block including a pixel at a position corresponding to the sum of the position of a left-top pixel of a collocated block and a disparity. The second reference block may be a right block of the first reference block. For example, an offset parameter for the left region of the current block can be acquired using an offset parameter of the first reference block and an offset parameter for the right region of the current block can be acquired using an offset parameter of the second reference block.

FIG. 8 illustrates an example of determining a reference block using disparity information according to an embodiment of the present invention.

When a block in a picture has a size of 2N×2N, an offset parameter can be acquired using 2N×N as a basic unit. The right half region of the first reference block and the left half region of the second reference block can be determined as a reference block. For example, an offset parameter of the left half region of the current block can be acquired using an offset parameter of the right half region of the first reference block and an offset parameter of the right half region of the current block can be acquired using an offset parameter of the left half region of the second reference block.

FIG. 9 illustrates an example of determining a reference block using disparity information according to an embodiment of the present invention.

A block in the reference picture, which corresponds to a larger portion of a block obtained using the disparity information, can be determined as a reference block. For example, when a larger portion of the block acquired using the disparity information is positioned in the first reference block rather than the second reference block, the first reference block can be determined as the reference block. The offset parameter of the current block can be acquired using the first reference block.

Figure 10:
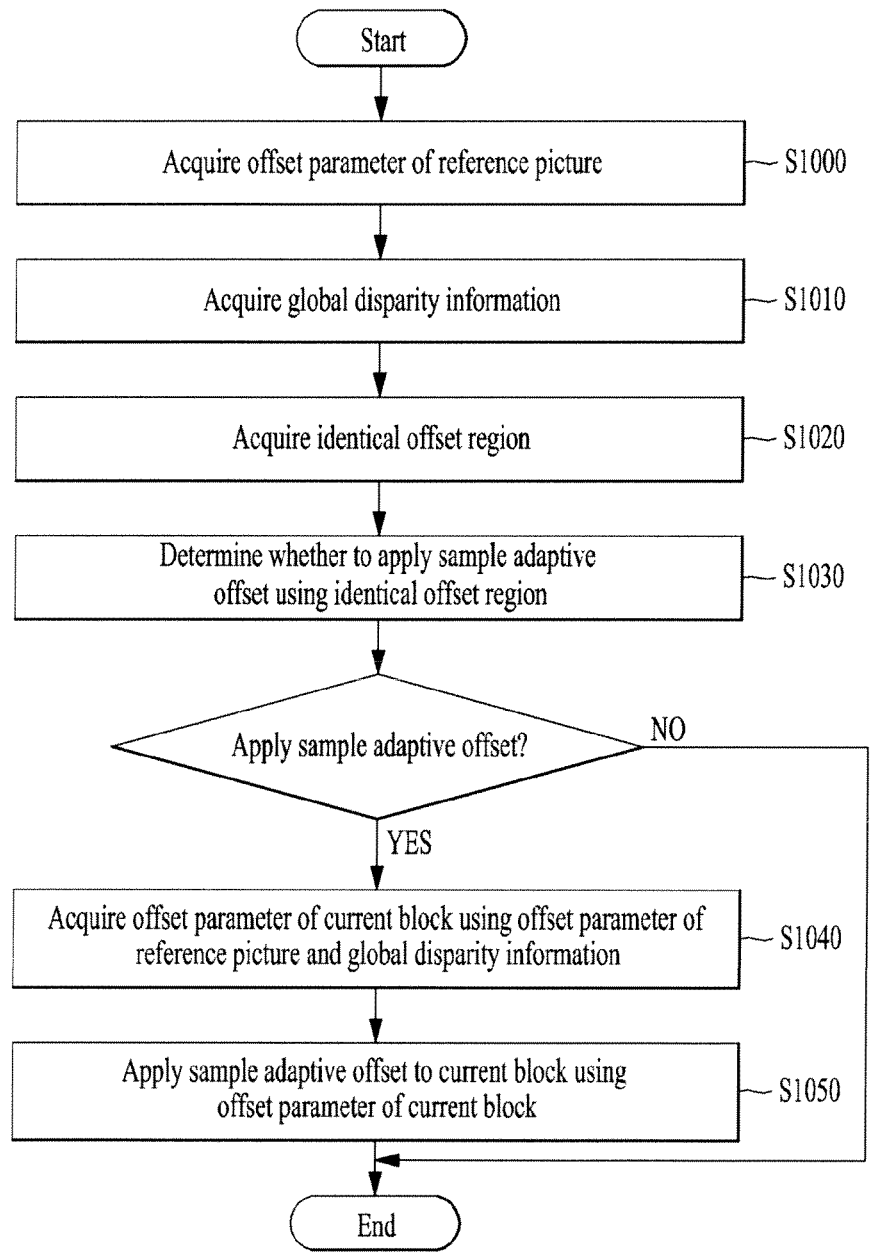
FIG. 10 is a flowchart illustrating a third embodiment of applying the sample adaptive offset to the current block using the offset parameter of the reference block as an embodiment of the present invention.

FIG. 10 is a flowchart illustrating a third embodiment of applying the sample adaptive offset to the current block using the offset parameter of the reference block as an embodiment to which the present invention is applied.

The offset parameter of the reference picture can be acquired (S1000). The method for obtaining the reference picture and the offset parameter is as described above with reference to FIG. 3.

Global disparity information can be obtained (S1010). The method of obtaining the global disparity information is as described above with reference to FIG. 5.

An identical offset region including the current block can be acquired (S1020). The identical offset region may refer to a region in a picture, for which the same offset parameter is acquired using left block merge information and top block merge information. The identical offset region can be obtained using the left block merge information or the top block merge information. An embodiment of obtaining the identical offset region will be described in detail with reference to FIG. 11.

Whether to apply the sample adaptive offset can be determined using the identical offset region (S1030). Whether to apply the sample adaptive offset can be determined by comparing a horizontal size of the identical offset region with a predetermined threshold value. For example, when the horizontal size of the identical offset region acquired in S1010 is less than the predetermined threshold value, the identical offset region may be sensitive to a global disparity and thus the sample adaptive offset may not be applied. On the contrary, when the horizontal size of the identical offset region is greater than the predetermined threshold value, the identical offset region is less sensitive to global disparity and thus the sample adaptive offset can be applied.

When application of the sample adaptive offset is determined, the offset parameter of the current block can be acquired using the offset parameter of the reference picture and global disparity information (S1040). The method of obtaining the offset parameter of the current block is as described above with reference to FIG. 5.

The sample adaptive offset can be applied to the current block using the offset parameter of the current block (S1050).

Figure 11:
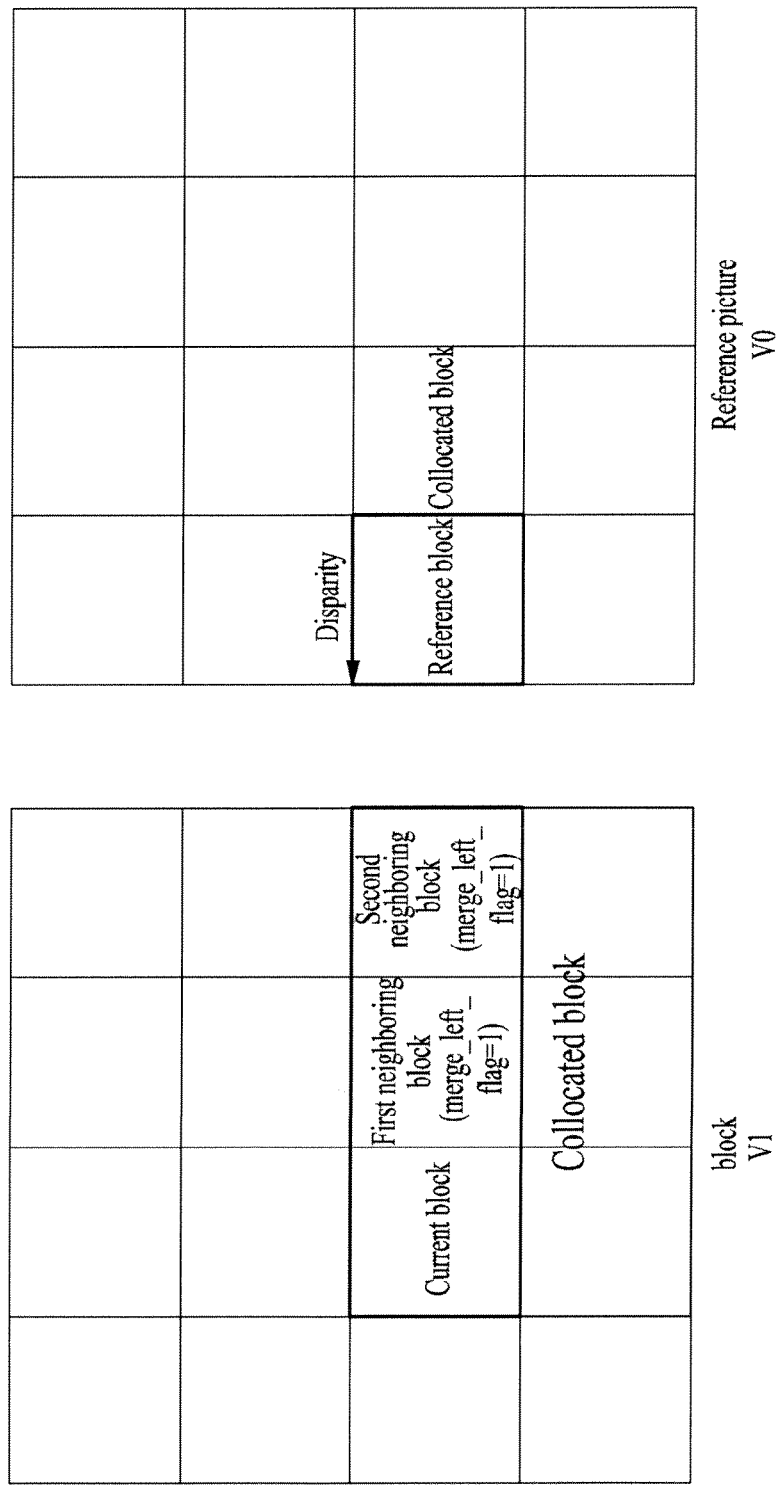
FIG. 11 illustrates an example of an identical offset region including the current block according to an embodiment of the present invention.

FIG. 11 illustrates an example of the identical offset region including the current block according to an embodiment of the present invention.

As described above, the identical offset region can be acquired using left block merge information or top block merge information. For example, referring to FIG. 8, since left block merge information of the first neighboring block is 1, the first neighboring block can have the same offset parameter as the current block corresponding to the left block thereof. Since left block merge information of the second neighboring block is also 1, the second neighboring block can have the same offset parameter as the first neighboring block corresponding to the left block thereof. Accordingly, the current block, the first neighboring block and the second neighboring block can have the same offset parameter. A region including the current block, the first neighboring block and the second neighboring block having the same offset parameter can be acquired as the identical offset region.

FIG. 12 is a flowchart illustrating a fourth embodiment of obtaining the offset parameter of the current block and applying the sample adaptive offset to the current block as an embodiment to which the present invention is applied.

The present embodiment is based on the assumption that an offset parameter of a reference picture, an offset parameter of a top block of the current block and an offset parameter of a left block of the current block have been acquired.

Whether the offset parameter of the current block is acquired from an offset parameter of a reference view can be determined using reference view merge information merge_base_view_flag of the current block (S1200). The offset parameter of the reference view can refer to an offset parameter of a block included in the reference view different from the current view. The reference view merge information can be acquired from a bitstream and can represent whether the offset parameter of the current block is acquired using the offset parameter of the reference view. For example, when the reference view merge information of the current block is 1, it can be determined that the offset parameter of the current block is acquired using the offset parameter of the reference block in the reference view. Conversely, when the reference view merge information of the current block is 0, it can be determined that the offset parameter of the current block is not acquired using the offset parameter of the reference block in the reference view.

When the offset parameter of the reference view is not used to acquire the offset parameter of the current block, whether the offset parameter of the current block is acquired from the offset parameter of the left block can be determined using left block merge information (S1210). The left block merge information can be acquired from a bitstream and represent whether the offset parameter of the current block is acquired using the offset parameter of the left block of the current block. For example, when the left block merge information of the current block is 1, it can be determined that the offset parameter of the current block is acquired using the offset parameter of the left block. Conversely, when the left block merge information of the current block is 0, it can be determined that the offset parameter of the current block is not acquired using the offset parameter of the left block.

When the offset parameter of the left block is not used to acquire the offset parameter of the current block, whether the offset parameter of the current block is acquired from the offset parameter of the top block can be determined using top block merge information (S1220). The top block merge information can be acquired from a bitstream and represent whether the offset parameter of the current block is acquired using the offset parameter of the top block of the current block. For example, when the top block merge information of the current block is 1, it can be determined that the offset parameter of the current block is acquired using the offset parameter of the top block. Conversely, when the top block merge information of the current block is 0, it can be determined that the offset parameter of the current block is not acquired using the offset parameter of the top block.

When the offset parameter of the top block is not used to acquire the offset parameter of the current block, the offset parameter of the current block can be extracted from a bitstream (S1230). Upon determining that acquisition of the offset parameter of the current block using the offset parameter of the reference view, left block or top block is not preferable, an encoder may transmit a bitstream including the offset parameter of the current block to a decoder.

The offset parameter of the current block can be acquired (S1240). As described above, the offset parameter of the current block can be acquired from the offset parameter of the reference view, the offset parameter of the left block, the offset parameter of the top block or the bitstream.

The sample adaptive offset can be applied to the current block using the offset parameter of the current block (S1250).

As described above, the decoding/encoding apparatus to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission through the Internet). In addition, a bitstream generated according to the encoding method may be stored in a computer-readable recording medium or transmitted using a wired/wireless communication network.

INDUSTRIAL APPLICABILITY

The present invention can be used to code a video signal.

The invention claimed is:

1. A method for processing a video signal by a decoding apparatus, comprising:
obtaining, by the decoding apparatus, an identical offset region in a current picture including a current block, the identical offset region indicating a region having a same offset parameter as the current block, the offset parameter indicating a prediction value of a difference between a pixel value of a block to which a deblocking filtering has been applied and a pixel value of a block to which a sample adaptive offset has been applied;

determining, by the decoding apparatus, whether to apply the sample adaptive offset by comparing a horizontal size of the identical offset region with a predetermined threshold value; and applying, by the decoding apparatus, the sample adaptive offset to the current block when the horizontal size of the identical offset region is greater than the predetermined threshold value, wherein, when the horizontal size of the identical offset region is less than the predetermined threshold value, the sample adaptive offset is not applied, and wherein applying the sample adaptive offset includes:

obtaining, by the decoding apparatus, a global disparity value indicating a disparity value of the current picture including the current block;

obtaining, by the decoding apparatus, an offset parameter of a reference block being indicated by the global disparity value;

obtaining, by the decoding apparatus, an offset parameter of the current block using the offset parameter of the reference block; and applying, by the decoding apparatus, the sample adaptive offset to the current block using the offset parameter of the current block, wherein the reference block is a block in a different view from the current block, and wherein the global disparity value is obtained using other global disparity value of other picture having a different picture order count (POC) from a POC of the current picture and a delta global disparity indicating a difference value between the global disparity value of the current picture and the other global disparity value of the other picture.

2. The method according to claim 1, wherein the reference block is positioned in a reference view, and the current block is positioned in a non-reference view.

3. The method according to claim 1, wherein the obtaining, by the decoding apparatus, of the offset parameter of the current block comprises obtaining, by the decoding apparatus, the offset parameter in units of pixels in the current block.

4. The method according to claim 1, wherein the obtaining, by the decoding apparatus, of the offset parameter of the current block comprises obtaining, by the decoding apparatus, the offset parameter in units of 2N×N when the current block has a size of 2N×2N.

5. A video decoder apparatus, comprising:

a memory;

an adaptive offset unit, coupled to memory, that:

obtains an identical offset region in a current picture including a current block, the identical offset region indicating a region having a same offset parameter as the current block, the offset parameter indicating a prediction value of a difference between a pixel value of a block to which a deblocking filtering has been applied and a pixel value of a block to which a sample adaptive offset has been applied, determines whether to apply the sample adaptive offset by comparing a horizontal size of the identical offset region with a predetermined threshold value, and applies the sample adaptive offset to the current block when the horizontal size of the identical offset region is greater than the predetermined threshold value, wherein, when the horizontal size of the identical offset region is less than the predetermined threshold value, the sample adaptive offset is not applied, and wherein applying the sample adaptive offset includes:

obtaining a global disparity value indicating a disparity value of the current picture including the current block, obtaining an offset parameter of a reference block being indicated by the global disparity value, obtaining an offset parameter of the current block using the offset parameter of the reference block, and applying the sample adaptive offset to the current block using the offset parameter of the current block, wherein the reference block is a block in a different view from the current block, and wherein the global disparity value is obtained using other global disparity value of other picture having a different picture order count (POC) from a POC of the current picture and a delta global disparity indicating a difference value between the global disparity value of the current picture and the other global disparity value of the other picture.

6. The video decoder apparatus according to claim 5, wherein the reference block is positioned in a reference view, and the current block is positioned in a non-reference view.

7. The video decoder apparatus according to claim 5, wherein the adaptive offset unit acquires the offset parameter of the current block in units of pixels in the current block.

8. The video decoder apparatus according to claim 5, wherein the adaptive offset unit acquires the offset parameter in units of 2N×N when the current block has a size of 2N×2N.

* * * * *